UNITED STATES PATENT OFFICE 2,100,671

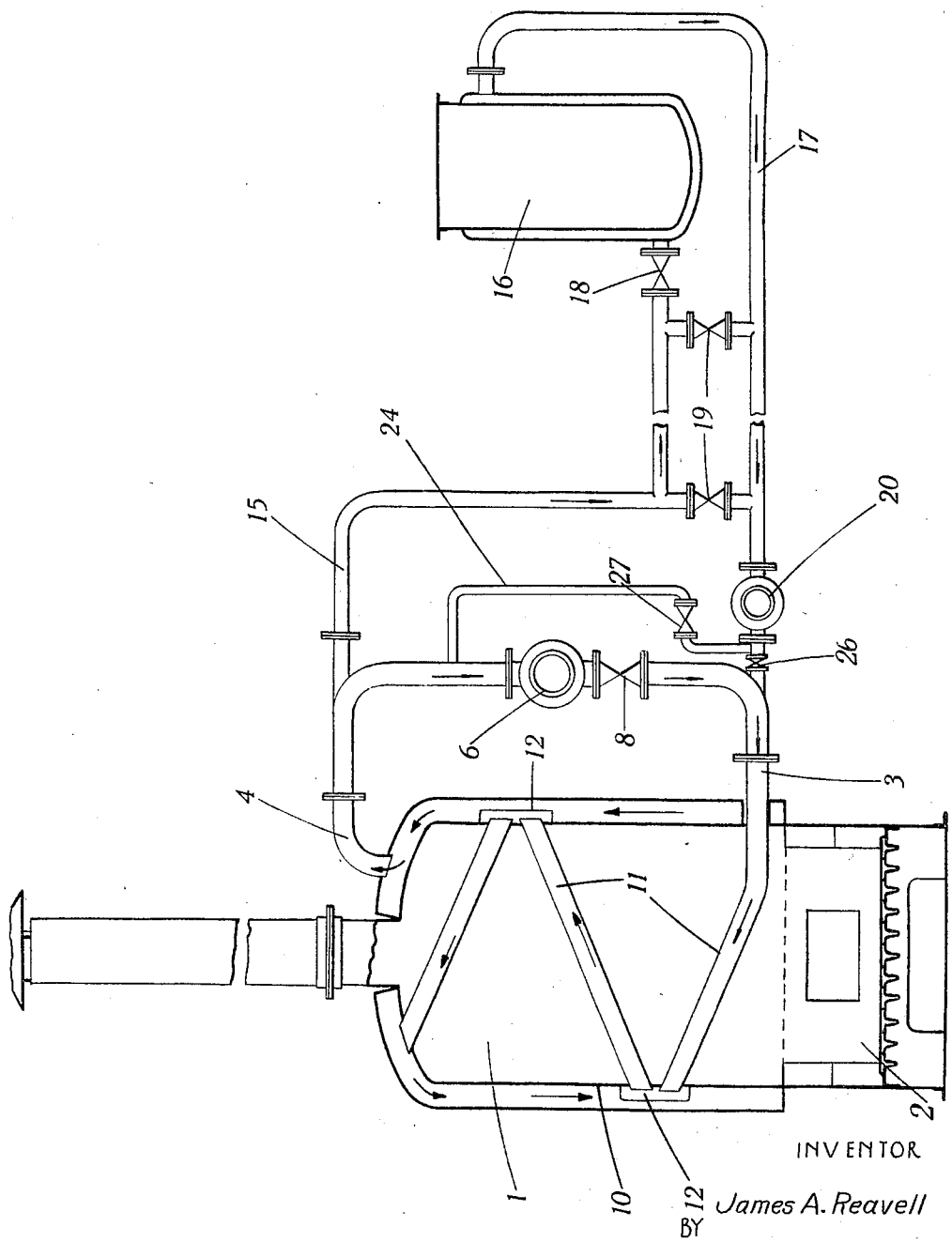

LIQUID CIRCULATION HEATING SYSTEM

James Arthur Reavell, Westminster, London, England, assignor to Parks-Cramer Company, Fitchburg, Mass., a corporation of Massachusetts Application November 12, 1936, Serial No. 110,462
In Great Britain November 23, 1935

1 Claim. (Cl. 237—63)

This invention relates to liquid circulation heating systems and has particular reference to systems of the type in which a selected oil after being heated by passage through a tubular or other form of heat absorber, is utilized as the heat transmitting medium for a treating vessel or other apparatus required to be heated. As is well known, such systems possess many advantages over steam, electric and other heating systems particularly as they enable high temperatures to be obtained without high pressure.

In systems of the type referred to, the absorber is usually built in a firebrick structure and the whole volume of oil or liquid used is pumped through the absorber and thence along a system of outgoing flow pipes to the treatment vessel or other apparatus to be heated and then back again through return flow pipes to the absorber.

In such a system, the velocity of the oil passing through the absorber and along the circulatory system must be not less than a predetermined value, e. g. five feet per second, otherwise the oil in the absorber cracks and the absorber becomes damaged or burnt out. For this and other reasons, such systems are invariably provided with a positive displacement pump of sufficient power and capacity to pump the whole volume of oil through the absorber and the circulating system of which the absorber forms a part at a velocity not less than the predetermined minimum value. Thus, the circulating pump used must be of ample proportions and power and especially designed to meet the conditions to be fulfilled, and, hence, it is expensive.

The chief object of the present invention is to provide an improved and simplified system of the type referred to by which the cost factor may be materially reduced without sacrificing the efficiency or reliability thereof.

More specifically, the invention is concerned with the provision of a simplified system in which the necessity for circulating the whole volume of oil or liquid used by a single pump is avoided and in which the arrangement is such that it is possible to use circulating pumps of less expensive forms such as, for example, pumps of the centrifugal type.

Another object is to provide an improved method of starting-up the system.

According to one feature of the invention the system is simplified by subdividing the liquid circulatory system into two correlated or intercommunicating circulatory systems each equipped with its own circulating pump. Hence, the system is provided with dual circulation systems, one on the absorber itself for circulating the oil in the heating unit or absorber and the other for circulating the heated oil around the heating circuit by which heat is carried to the various vessels or apparatus to be heated, the arrangement being such that although the two circuits are intercommunicating the quantity and velocity of the oil through the heating circuit is independent of the quantity and velocity of the oil passing through the absorber.

In carrying the invention into effect according to one convenient mode, one circulatory system is arranged so that the liquid or oil is continuously withdrawn from one part of the absorber by a pump which serves to circulate the oil through a series of heating tubes in the absorber and then back again into the main body of the absorber whilst the other circulatory system is arranged to enable heated liquid to be withdrawn from the absorber by another pump or pumps which serve to circulate the heated liquid through the jacket of a treating vessel or other apparatus to be heated and then back again into the absorber. By this arrangement, the layout of the plant is simplified and the load on the pumps is reduced. In most instances, the pump associated with the absorber will be a relatively large pump of the centrifugal type whilst the heating circulation system may incorporate one or more small positive displacement pumps.

In the starting-up of the system, when cold, the load on the pump used for passing the liquid through the absorber will be high owing to the fact that a large body of oil which is cold and therefore in a very viscous condition has to be moved. If desired, therefore, provisions may be made for facilitating the starting-up operation and such provisions may include means for enabling the pump associated with the heating circuit to be utilized for circulating some of the oil through the pump used for passing liquid through the absorber so as to obtain a quicker start. For example, a bye-pass arrangement may be provided so that the outlet from the positive displacement pump associated with the heating circulation system may be interconnected through the bye-pass with the inlet of the other or absorber pump whilst the supply of oil to the heating circulation system is temporarily shut off, thereby enabling oil to be taken from the main or heater circuit and pumped through the centrifugal pump in such a manner as to obtain the maximum amount of heated oil as quickly as possible in the latter pump and the absorber circuit. It will be appreciated, however, that when once the oil has been heated to the desired temperature, the bye-pass may be closed and the valve controlling the supply to the heating circulation system may be opened and that, thereafter, the velocity of the oil circulating in the latter system will be quite independent of the velocity of the oil in the absorber circuit.

In order that the said invention may be clearly understood and readily carried into effect, the same will now be more fully described with reference to the accompanying drawing in which (1) indicates an absorber provided at the lower part thereof with a furnace (2) and with an inlet (3) for the oil to be heated. The outlet for the heated oil is indicated at (4) and between the inlet and the outlet is arranged a pump (6) which serves to circulate the oil through the absorber. The connection between the inlet and the outlet preferably also includes a stop valve (8).

The absorber may be of any suitable type. In the embodiment illustrated, the inner chamber of the jacketed vessel (10) has extending transversely thereacross a plurality of cross tubes (11) interconnected with one another by headers (12) fitted in position within the jacket, the arrangement being such that the oil entering the absorber through the inlet (3) is caused to pass through the cross tubes and afterwards from the tubes and through the jacket before passing out through the outlet (4) provided at the upper end of the absorber. Preferably, means are provided within the jacket for causing the oil to traverse a circuitous or extended path before being permitted to escape through the outlet.

In addition to the liquid circulatory system incorporating the pump (6) for circulating the oil through the absorber, the system is provided with a second liquid circulatory system for circulating the heated oil around the heating circuit by which heat is carried to the vessel or various vessels or apparatus to be heated. The said second circulatory system is also connected across the absorber inlet and outlet and comprises an outgoing pipe line (15) for carrying heated oil from the absorber outlet to the apparatus (here shown as a jacketed pan (16)) required to be heated and a return pipe line (17) for returning the oil to the absorber inlet. The outgoing pipe line preferably includes an adjustable valve (18) for enabling the inlet to the pan to be regulated and between the outgoing and return pipe lines one or more valve-controlled bye-passes (19) may be provided to enable the pan or pans to be short-circuited when necessary, or to permit regulation of the flow and its heating effect. As mentioned above, the second liquid circulatory system is fitted with its own circulating pump or pumps preferably of the positive displacement variety. In the embodiment illustrated, only one pump, viz. the pump (20), is provided in the second liquid circulating system but, in some instances, particularly where several pieces of apparatus or pans are required to be heated or where the second circulating system is divided into two or more correlated circuits, two or more pumps may be found necessary or advisable in this part of the system.

As already intimated, in order to facilitate the starting-up of the system when cold, means may be provided for enabling the pump associated with the heating circuit to be utilized for circulating some of the oil through the pump used for passing liquid through the absorber and, in the arrangement illustrated, such means comprise a valve-controlled bye-pass (24) by which the outlet from the pump (20) may be interconnected with the inlet of the absorber pump (6) whilst the supply of oil to the heating circulation system is temporarily shut off. In other words, when using the bye-pass, the valve (26) is closed and the valve (27) is opened. Alternatively, the valve (27) is closed and valve (26) is opened to enable the oil to be pumped directly into the absorber.

Having thus described my said invention what I claim as new therein and desire to secure by Letters Patent is:—

A liquid circulation heating system of the character described comprising the combination of an absorber, means for heating the absorber, means interconnecting the absorber with two correlated and intercommunicating circulatory systems, a circulating pump in each system so that one serves for the circulation of the oil through the absorber whilst the other pump serves for the circulation of the heated oil through a heating circuit including means to be heated, and a valve controlled bye-pass permitting the outlet from the heating circuit pump to be connected with the inlet of the absorber pump.

JAMES ARTHUR REAVELL.